June 29, 1954     F. H. KEATON ET AL     2,682,442
INDICATING MEANS FOR RAIL FLAW DETECTING APPARATUS
Filed July 23, 1948     2 Sheets-Sheet 1
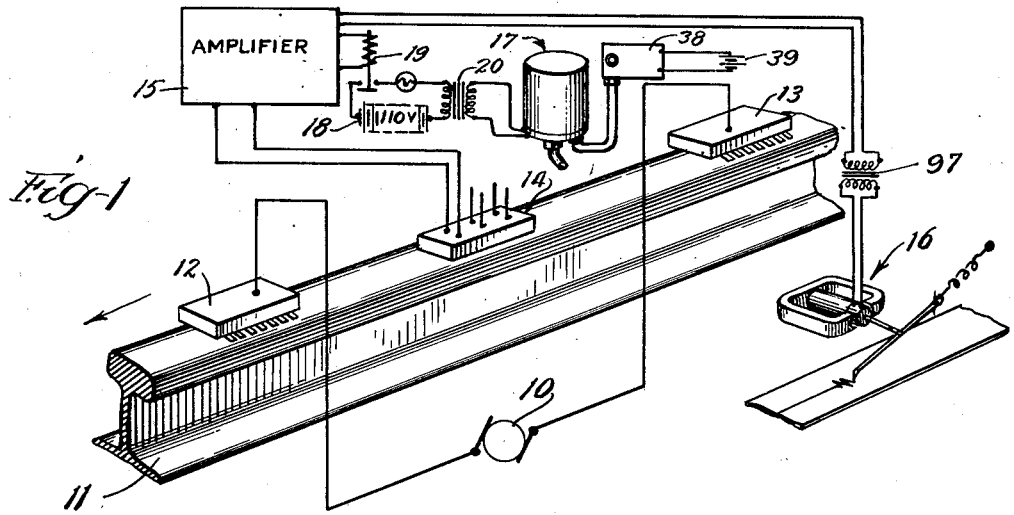
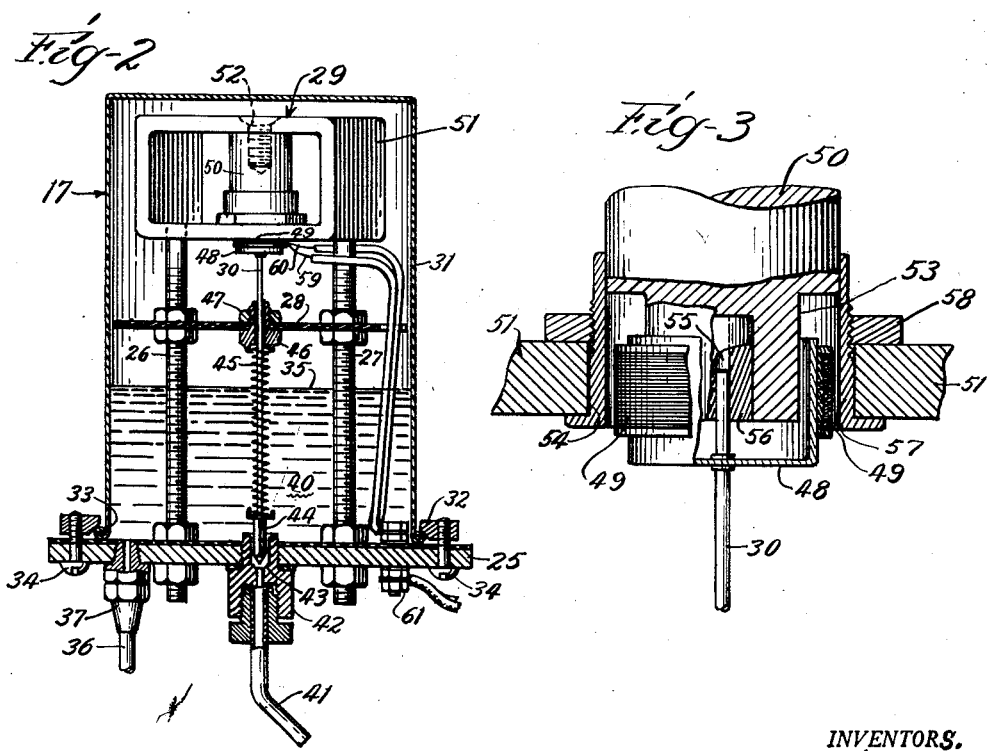
INVENTORS.
David C. Bettison &
Frank H. Keaton.

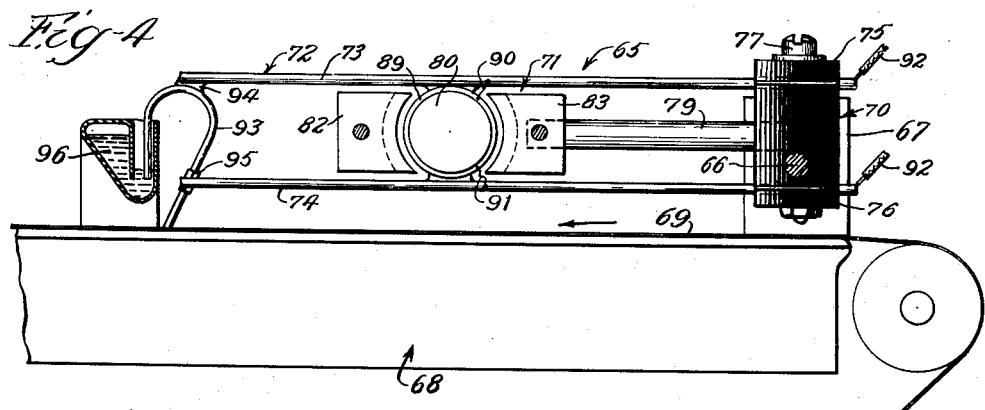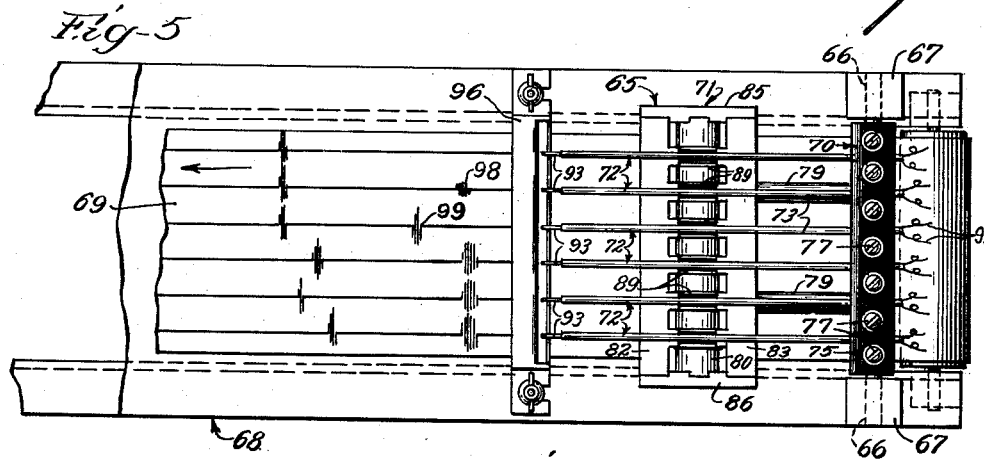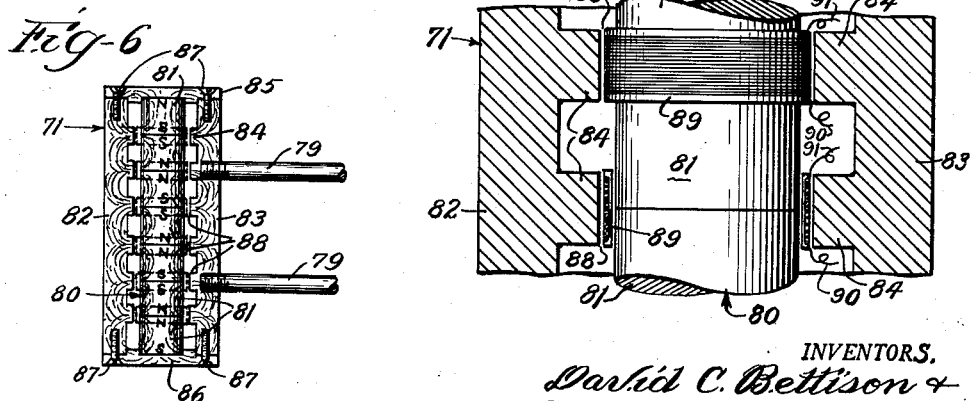

Patented June 29, 1954

2,682,442

UNITED STATES PATENT OFFICE 2,682,442

INDICATING MEANS FOR RAIL FLAW DETECTING APPARATUS

Frank H. Keaton and David C. Bettison, Omaha, Nebr.

Application July 23, 1948, Serial No. 40,278

6 Claims. (Cl. 346—33)

This invention relates to apparatus for detecting flaws in rail, and is particularly concerned with the means for visually indicating the presence of a flaw.

Customarily, rail flaw detecting apparatus comprises a detector car which travels along the track and progressively energizes the rail, either by passing an electric current therethrough, or by longitudinally magnetizing the rail. In either case, the energizing of the rail causes magnetic conditions to be set up in the vicinity of fissures, and these are located by inductive coils that are moved over the surface of the rail head.

When a coil traverses a magnetic field such as is present in the vicinity of a fissure, a voltage wave is generated which is suitably amplified and then made to operate a pen unit associated with a moving tape, and this tape with its pen record is under the constant surveillance of the detector car operator.

To assist the car operator in correlating the pen record with rail conditions visible from the car, a paint gun is caused to operate concurrently with the pen to place a daub of paint or oil on the rail adjacent to the place causing the indication.

It is the principal object of this invention to improve the indicating means used with rail flaw detecting apparatus, and particularly the pen units and paint gun units which comprise a part thereof. More specifically, it is an object of the invention to cause these units to respond instantaneously to flaw impulses and produce a record or indication which facilitates the identification of flaws in rail.

A further object of the invention is to simplify the construction of the indicating means so that its initial cost is less and maintenance is reduced to a minimum.

These and further objects and advantages will become apparent as the disclosure proceeds and the description is read in conjunction with the accompanying drawings, in which Fig. 1 is a diagrammatic perspective view showing the invention applied to the electro-inductive system of rail flaw detection;

Fig. 2 is a vertical sectional view showing a preferred form of a paint gun unit embodying the invention;

Fig. 3 is an enlarged detail view showing the operating coil, and with parts of the view broken away to expose the structure beneath;

Fig. 4 is a side elevational view showing a pen unit embodying the principles of this invention;

Fig. 5 is a plan view of the pen unit shown in Fig. 4;

Fig. 6 is a horizontal sectional view of the magnet block employed in the pen unit; and Fig. 7 is a fragmentary view showing some of the details of the magnet block and the associated coils.

The choice of particular embodiments of the invention for specific illustration and description is merely a compliance with section 4888 of the Revised Statutes, and should not be construed as imposing unnecessary limitations on the appended claims.

Referring first to Fig. 1 which illustrates the invention applied to the electroinductive system of rail flaw detection, the generator 10 supplies a low voltage, high amperage current to the rail 11 by means of spaced current brushes 12 and 13, and as the current brushes are moved along the rail in the direction indicated by the arrow, the rail becomes progressively energized to set up characteristic magnetic conditions in the vicinity of fissures.

A detecting unit, generally designated 14, is mounted on the detector car between the current brushes 12 and 13 and moves along the rail in close proximity thereto. The detecting unit comprises one or more induction coils (not shown) and these may be positioned either transversely of the rail or longitudinally thereof in a manner well known to the art. Ordinarily, the detecting coils are arranged in pairs connected in series opposition so that variations in the current introduced into the rail will balance out in the detector coils, and only those magnetic conditions in the vicinity of fissures, or, in some cases, surface defects, will cause an impulse to be transmitted to the amplifying and recording apparatus.

Voltage impulses generated in the detecting unit 14 are passed through an amplifier 15 of suitable design, and the output of the amplifier is caused to operate indicating means comprising a pen unit, generally designated 16 (spring biased to center position), and a paint gun unit, generally designated 17. For simplicity, only one amplifier, one pen unit, and one paint gun unit are shown in Fig. 1, but it will be understood that normally a detecting unit will comprise a plurality of sets of detector coils, each of which is channeled through its own amplifier and caused to operate its own pen in a gang pen unit (such as shown in Figs. 4 to 7, inclusive). Ordinarily, only one paint gun unit will be employed on each side of the car (one associated with each rail), and the paint gun unit is so connected to the amplifier that an impulse delivered to the amplifier by any one of the sets of detector coils will cause the paint gun unit 17 to deliver a daub of paint or oil on the rail.

The paint gun unit 17 is preferably operated from a 110 volt direct current source as indicated at 18, and a relay 19 connected into the plate circuit of the last tube of the amplifier or amplifiers closes the 110 volt circuit whenever any one of the detecting coil sets transmits a flaw impulse. The impulse set up in the 110 volt circuit upon the closing of the relay 19 is transmitted through a transformer 20 to the paint gun coil as will later be described.

All of this is conventional and need not be described further.

The paint gun unit 17 is shown in Figs. 2 and 3, and it comprises a base 25 from which rises a pair of studs 26 and 27 carrying a fibre disc platform 28 spaced from the base 25, and also carrying at their upper extremities a magnet-coil unit, generally designated 29, which serves to lift a plunger 30 momentarily in response to a flaw impulse. A sheet metal housing 31 encloses the magnet-coil unit 29 and its associated structure, and is hermetically sealed by a clamping ring 32 which bears on the beaded rim 33 of the housing 31 and is clamped against the base 25 by screws 34.

The housing 31 is filled to a pre-determined level, as indicated at 35, with paint or oil, and this is accomplished through a tubulature 36 having an appropriate fitting 37 for connection with the base 25. Paint or oil is forced into the housing 31 by any suitable pumping means, such for example, as an auto pulse liquid pump indicated diagrammatically at 38 in Fig. 1, and having an electromagnetically actuated pumping diaphragm energized from a suitable source of electromotive force as indicated at 39. The pumping unit 38 is designed to pump fluid until a predetermined head pressure is reached, after which the pumping stops until the head pressure is reduced below some pre-determined smaller pressure. In this instance, the forcing of oil or paint into the housing 31 compresses the air within the housing until a predetermined pressure is reached, say, six or seven pounds, and then the pumping stops. This results in the fluid 40 within the housing 31 being under a constant head pressure with the result that lifting of the plunger 30 will immediately cause fluid 40 to be ejected from the gun through a nozzle 41 having a suitable nipple connection 42 with the base 25. The nipple 42 has an internal seat 43 cooperating with a machined head 44 of the plunger 30 so that when the plunger is in its lower position, the interior of the enclosure 31 is sealed from the atmosphere.

The plunger 30 is normally held in its lower position by a compression spring 45 which extends between the head 44 and a guide collar 46 secured by a nut 47 to the platform 28. The plunger 30 is preferably a non-magnetic stainless steel rod or needle which carries the head 44 at its lower end and a cup-shaped, non-magnetic element 48 at its upper end with a coil 49 mounted firmly on the exterior of the element 48. Coil 49 cooperates with a magnetic circuit which comprises a strong permanent magnetic core 50 and a box-like soft iron pole piece 51. Core 50 may be secured to the pole piece 51 by a screw 52, and preferably its lower end is reduced as indicated at 53 where it passes through a circular opening 54 in the pole piece. The air gap between the pole piece 51 and the reduced portion 53 of the core 50 results in the coil 49 lying within a strong unidirectional magnetic field so that when the coil 49 is energized by the passing of a current therethrough, the magnetic field which it sets up coacts with the unidirectional magnetic field in the iron circuit (unidirectional in the sense that the poles 51 are of the same polarity, with the pole 53 of opposite polarity whereby the coil 49 when energized is subjected to unidirectional force) to cause the plunger 30 to be lifted. Collapsing the field magnetism of transformer 20 causes a reverse current to flow through coil 49, thus forcing plunger 30 downwardly to close the paint valve 44. Spring 45 aids in closing the valve, and maintains the valve closed until the coil 49 is again energized.

The upper end of the plunger 30 is guided in a cylindrical recess 55 of a non-magnetic insert 56 fitted into the end of the core 50. In order to more accurately position the lower end of the core 50 within the opening 54 of the pole piece, a sleeve 57 may be fitted into the opening 54 to engage the core and fix its position. The sleeve 57 is made of non-magnetic material and is held in place by a nut 58 of like material.

The leads 59 and 60 from the coil 49 are suitably insulated from each other and connected to binding posts 61 on the base 25.

The operation of the paint gun in response to a flaw indication is obvious; energization of the relay 19 closes the 110 volt circuit, thereby causing an impulse to be delivered through the transformer 20 to the coil 49. This impulse momentarily causes the coil 49 to move upwardly translationally within the air gap, thereby unseating the head 44 and causing paint or oil to be ejected through the nozzle 41 by reason of the air pressure carried within the air dome or enclosure 31. The spring 45 immediately reseats the head 44 so that only a predetermined amount of paint is ejected for each energization of the coil 49.

The pen unit 16 operates on much the same principle as the paint gun unit, but in its preferred form (shown in Figs. 4 to 7, inclusive), it comprises a plurality of independently actuated pens, each of which responds to impulses received from a separate detector and amplifier. The gang pen unit, generally designated 65, is pivotally mounted by trunnion bearings 66 on standards 67 so that the entire unit may be swung in a clockwise direction away from the recording table, generally designated 68. A paper chart 69 is moved in the direction of the arrow (Fig. 5) across the recording table at a speed proportional to car speed, the drive for the chart being geared to the car axle in a conventional manner. The chart travels beneath the pen unit 65, as clearly shown in Figs. 4 and 5.

The gang pen unit 65 comprises a pivot block 70, a magnet block 71, and a plurality of independently operated pens, generally designated 72. Each pen 72 consists of a top arm 73 and a bottom arm 74, both of which preferably are made of non-magnetic stainless steel and are capable of lateral flexing about the pivot block 70 to which they are clamped by clamping plates 75 and 76, respectively, which are held in place by bolts 77. This rigid mounting provides a center bias to the pen arms, and to the recorded ink line. The pivot or anchor block 70 and the clamping plates 75 and 76 are preferably made of Bakelite or similar insulating material.

The magnet block 71 is supported in cantilever fashion by studs 79 which are threaded into the pivot block and the magnet block.

The magnet block 71 comprises a core 80 made up of a plurality of permanent magnet slugs 81 arranged so that like poles abut each other as shown particularly in Fig. 6. Soft iron return poles 82 and 83 are provided with arcuate projections 84 adjacent to the juncture of the slugs, and the entire assembly is clamped together by end pieces 85 and 86 held in place by screws 87. The end pieces 85 and 86 are also preferably of soft iron.

The resultant magnetic field set up by this arrangement is shown in Fig. 6, and it is clear that a strong magnetic field exists in each of the annular air gaps 88 adjacent to the projections 84.

Securely fastened by hard-setting plastic cement between the upper and lower arms 73 and 74 of each pen 72 is a coil 89 which is telescoped over the core 80 and rides free in its associated air gap 88. Each coil is wound with fine gauge silk enamel copper wire, and the gauge of the wire and number of turns will be determined by the desired operating characteristics. One lead of each coil is connected to the top arm 73 of the associated pen, as indicated at 90, and the other lead is connected to the lower arm 74, as indicated at 91, so that the arms 73 and 74 constitute a part of the electrical circuit which energizes the coils 89. Leads from the arms 73 and 74 for connection with the amplifiers with which each pen is associated are indicated at 92.

A hollow stylus 93 is carried at the end of each pen 72, the stylus comprising a bent metal tube which is soldered at 94 to the top arm 73, and similarly soldered to lower arm 74 but through an insulating band or bushing 95. One end of the stylus rests on the paper chart 69, and the other end dips into an ink fountain 96 which is mounted on the recording table 68 and straddles the chart 69. Ink is fed through the stylus 93 by siphonic action to produce a line on the chart as the chart moves under the pen unit.

Each of the coils 89 is connected through the leads 92 with an output transformer 97 (Fig. 1) fed from the plate circuit of the associated amplifier. Whenever there is a change in the plate circuit of the output tube of the associated amplifier, the coil 89 associated with that amplifier becomes energized and moves either upwardly or downwardly (Fig. 7), the direction depending upon the direction of the winding and whether the plate current is increasing or decreasing. Furthermore, the extent of movement of the coil 89 is proportional to the change in plate current so that the indication made on the paper chart 69 is related to the strength of the impulse which produced it. For example, the indication 98 was obviously produced by a weaker impulse than the indication 99, and an experienced operator can tell from the size of the indication and polarity much concerning the rail condition which induced the indication.

Obviously, modifications in the structure of the paint gun unit and the pen unit will occur to those skilled in the art, without departing from the spirit of this invention.

We claim:

1. Indicating means for rail flaw detecting apparatus of the type in which a plurality of detector coils are moved along a rail to inductively search for characteristic magnetic conditions in the vicinity of flaws, said indicating means comprising a magnet block having a core portion and a side portion spaced from the core portion to provide an air gap, said magnet block being magnetized to produce a magnetic field across said gap, a plurality of conductors mounted for independent substantially linear translational movement transversely of the gap, and a pen stylus carried by each of said conductors, said core portion comprising a plurality of juxtaposed permanent magnetic slugs having like poles facing one another to provide a series of laterally directed concentrations of magnetic flux.

2. Indicating means for rail flaw detecting apparatus of the type in which a plurality of detector coils are moved along a rail to inductively search for characteristic magnetic conditions in the vicinity of flaws, said indicating means comprising a magnet block having a core portion and a side portion spaced from the core portion to provide an air gap, said magnet block being magnetized to produce a magnetic field across said gap, a plurality of conductors mounted for independent substantially linear translational movement transversely of the gap, and a pen stylus carried by each of said conductors, said core portion comprising a plurality of juxtaposed permanent magnetic slugs having like poles facing one another to provide a series of laterally directed concentrations of magnetic flux, and the side portions having arcuate projections located substantially at the juncture of the magnet slugs.

3. Indicating means for rail flaw detecting apparatus of the type in which a plurality of detector coils are moved along a rail to inductively search for characteristic magnetic conditions in the vicinity of flaws, said indicating means comprising a magnet block having a core portion and a side portion spaced from the core portion to provide a plurality of air gaps, said magnetic block being magnetized to produce a relatively strong magnetic field across said gaps, an anchor block, a plurality of pairs of resilient pen arms mounted on the anchor block and extending on opposite sides of the magnet block, a pen stylus carried at the free end of each pair of pen arms, and a plurality of coils telescoped over the core portion and within the air gaps mounted for independent substantially linear translational movement transversely of the gaps with each coil connected at its top and bottom respectively to each pair of pen arms.

4. Indicating means for rail flaw detecting apparatus of the type in which a plurality of detector coils are moved along a rail to inductively search for characteristic magnetic conditions in the vicinity of flaws, said indicating means comprising an anchor block, a magnet block spaced from said anchor block and having a core portion and side portions spaced apart from the core portion to provide a plurality of parallel air gaps, said magnet block being magnetized to produce a relatively strong unidirectional magnetic flux across each gap, a plurality of pairs of resilient conducting pen arms mounted on the anchor block and extending on opposite sides of the magnet block, a pen stylus insulatedly carried at the free end of each pair of pen arms, and a plurality of coils telescoped over the core portion and within the said parallel air gaps mounted for independent, substantially linear, translational movement transversely of the gaps with each coil being electrically and magnetically connected at its top and bottom respectively to the top and bottom of the conducting pen arms associated therewith.

5. Indicating means for rail flaw detecting apparatus of the type in which a plurality of detector coils are moved along a rail to inductively search for characteristic magnetic conditions in the vicinity of flaws, said indicating means comprising an anchor block, a magnet block spaced from said anchor block and having a core portion and side portions spaced apart from the core portion to provide a plurality of parallel air gaps, said core portion comprising a plurality of juxtaposed, permanent magnetic slugs having like poles facing one another to provide a series of laterally directed concentrations of undirectional magnetic flux, and the side portions having opposed arcuate projections located substantially at the juncture of the magnetic slugs, said magnet block being magnetized to produce a relatively strong unidirectional magnetic flux across each gap, a plurality of pairs of resilient conducting pen arms mounted on the anchor block and extending on opposite sides of the magnet block, a pen stylus insulatedly carried at the free end of each pair of pen arms, and a plurality of coils telescoped over the core portion and within the said parallel air gaps mounted for independent, substantially linear, translational movement transversely of the gaps with each coil being electrically and magnetically connected at its top and bottom respectively to the top and bottom of the conducting pen arms associated therewith.

6. Indicating means for rail flaw detecting apparatus of the type in which a plurality of detector coils are moved along a rail to inductively search for characteristic magnetic conditions in the vicinity of flaws, said indicating means comprising an anchor block, a magnet block spaced from said anchor block and having a core portion and side portions spaced apart from the core portion to provide a plurality of parallel air gaps, said magnet block being magnetized to produce a relatively strong unidirectional magnetic flux across each gap, a plurality of resilient pen arms mounted on the anchor block each of which extends alongside one of said gaps and laterally of the axis of the core portion of said magnet block, a pen stylus carried at the free end of each pen arm, and a plurality of coils telescoped over the core portion and within said parallel air gaps mounted for independent, substantially linear, translational movement transversely of the gaps with each coil being secured to and carried by the adjacent resilient arm.

References Cited in the file of this patent

UNITED STATES PATENTS

| Number | Name | Date |
|---|---|---|
| 1,521,007 | Chubb | Dec. 30, 1924 |
| 1,820,088 | Parker et al. | Aug. 25, 1931 |
| 1,877,243 | Ising | Sept. 13, 1932 |
| 2,103,851 | Jones et al. | Dec. 28, 1937 |
| 2,103,868 | Perry | Dec. 28, 1937 |
| 2,170,977 | Schumacher et al. | Aug. 29, 1939 |
| 2,183,118 | Drake | Dec. 12, 1939 |
| 2,185,589 | Drake et al. | Jan. 2, 1940 |
| 2,265,136 | Barnes et al. | Dec. 9, 1941 |
| 2,279,124 | Mayne | Apr. 7, 1942 |
| 2,300,463 | Palme | Nov. 3, 1942 |
| 2,322,452 | Jones | June 22, 1943 |
| 2,336,198 | Stotz | Dec. 7, 1943 |
| 2,348,744 | McMurry | May 16, 1944 |
| 2,356,968 | Barnes et al. | Aug. 29, 1944 |
| 2,380,609 | Pearce | July 31, 1945 |
| 2,419,099 | Wall | Apr. 15, 1947 |
| 2,467,328 | Mesh | Apr. 12, 1949 |
| 2,507,863 | Mesh | May 16, 1950 |

FOREIGN PATENTS

| Number | Country | Date |
|---|---|---|
| 646,784 | Germany | June 21, 1937 |